United States Patent
Dyer et al.

(10) Patent No.: US 11,962,132 B2
(45) Date of Patent: Apr. 16, 2024

(54) SUPPORT BRACKET FOR TRANSFORMER SWITCH UTILIZING EXISTING TRANSFORMER CONNECTION POINTS

(71) Applicant: S&C Electric Company, Chicago, IL (US)

(72) Inventors: Thomas J Dyer, Minneola, FL (US); Nicholas Seng, Chicago, IL (US); Joseph W. Milton, Milwaukee, WI (US); David G. Porter, East Troy, WI (US)

(73) Assignee: S&C Electric Company, Chicago, IL (US)

( * ) Notice: Subject to any disclaimer, the term of this patent is extended or adjusted under 35 U.S.C. 154(b) by 86 days.

(21) Appl. No.: 17/963,876

(22) Filed: Oct. 11, 2022

(65) Prior Publication Data

US 2023/0148054 A1    May 11, 2023

Related U.S. Application Data

(60) Provisional application No. 63/278,219, filed on Nov. 11, 2021.

(51) Int. Cl.
 *H02B 1/04* (2006.01)
 *H02B 1/32* (2006.01)
 *H02B 7/08* (2006.01)
(52) U.S. Cl.
 CPC ............. *H02B 1/04* (2013.01); *H02B 1/32* (2013.01); *H02B 7/08* (2013.01)

(58) Field of Classification Search
 CPC ..... H02B 1/04; H02B 1/32; H02B 7/08; F16C 7/06
 See application file for complete search history.

(56) References Cited

U.S. PATENT DOCUMENTS

| | | | |
|---|---|---|---|
| 9,157,474 B2* | 10/2015 | Davis | B60B 7/08 |
| 9,247,997 B2* | 2/2016 | Stefanchik | A61B 17/3417 |
| 11,384,781 B2* | 7/2022 | Glaser | F16B 7/06 |
| 2021/0270312 A1* | 9/2021 | Thompson | F16B 7/06 |
| 2022/0316521 A1* | 10/2022 | Sultan | F16C 7/02 |
| 2023/0014710 A1* | 1/2023 | Kelley | F16M 13/02 |
| 2023/0197375 A1* | 6/2023 | Dyer | H01H 21/22 |
| | | | 200/318 |
| 2023/0290545 A1* | 9/2023 | Kelley | H02B 1/18 |

* cited by examiner

*Primary Examiner* — Robert J Hoffberg (57) ABSTRACT

A support bracket assembly for supporting a pair of bushing well interrupter devices provided within a transformer enclosure that encloses a transformer. The support bracket assembly includes a mounting bracket assembly rigidly secured to a parking stand on the enclosure and including a plurality of mounting bosses. The support bracket assembly further includes support brackets, a first adjustable link secured to one of the mounting bosses on the mounting assembly and a mounting boss on a support bracket, a second adjustable link secured to another one of the mounting bosses on the mounting assembly and a mounting bosses on a support bracket, and a third adjustable link secured to mounting bosses on two support bracket, where the first, second and third adjustable links form a triangular configuration.

20 Claims, 6 Drawing Sheets

SUPPORT BRACKET FOR TRANSFORMER SWITCH UTILIZING EXISTING TRANSFORMER CONNECTION POINTS

CROSS-REFERENCE TO RELATED APPLICATION

This application claims the benefit of priority from the U.S. Provisional Application No. 63/278,219, filed on Nov. 11, 2021, the disclosure of which is hereby expressly incorporated herein by reference for all purposes.

BACKGROUND

Field

The present disclosure relates generally to a support bracket assembly for supporting a pair of switching devices provided within a transformer enclosure and, more particularly, to a support bracket assembly for supporting a pair of bushing well interrupter devices provided within a transformer enclosure for a transformer used in an underground residential power distribution network.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three-phase feeders including three single-phase feeder lines that carry the same current but are 120° apart in phase. three-phase and single phase lateral lines are tapped off of the feeder that provide the medium voltage to various distribution transformers, where the voltage is stepped down to a low voltage and is provided to loads, such as homes, businesses, etc.

Periodically, faults occur in the distribution network as a result of various things, such as animals touching the lines, lightning strikes, tree branches falling on the lines, vehicle collisions with utility poles, etc. Faults may create a short-circuit that increases the load on the network, which may cause the current flow from the substation to significantly increase, for example, many times above the normal current, along the fault path. This amount of current causes the electrical lines to significantly heat up and possibly melt, and also could cause mechanical damage to various components in the substation and in the network. Power distribution networks of the type referred to above often include switching devices, breakers, reclosers, interrupters, etc. that control the flow of power throughout the network, and may be used to isolate faults within a faulted section of the network.

As part of its power distribution network, many utility companies employ underground single-phase lateral circuits that feed residential and commercial customers. Often times these circuits are configured in a loop and fed from both ends, where an open location, typically at a transformer, is used in the circuit to isolate the two power sources. Although providing underground power cables protects circuits from faults created by things like storms and vegetation growth, underground cables still may break or otherwise fail as a result of corrosion and other things.

For a residential loop circuit of the type referred to above having two power sources, it is usually possible to reconfigure the open location in the circuit so that loads that are affected by a failed cable are fed by the other source and service to all of the loads is maintained. However, known processes for identifying the location of a cable failure and the subsequent reconfiguration of the open location often result in long power restoration times because workers are required to physically go to the transformers to test for power and then reconfigure the transformers to change the open location.

It has been proposed to provide bushing well interrupter devices in the existing transformers for these types of loop circuits that provide automatic protection, isolation and restoration of underground residential cable loops and methods to switch cable segments without handling cable elbows. If the bushing well interrupter devices can be installed without modifying the existing transformers, it will be that much more appealing to the utility. However, the addition of the bushing well interrupter devices, which can be relatively heavy, puts added stress on the transformer bushings due to the added weight and off-center moments, which may cause the bushings to prematurely wear out and have to be replaced. Therefore, a support bracket for supporting the bushing well interrupter devices may be necessary. Such a support bracket must be flexible enough to connect to a variety of transformers that have been manufactured by different companies with limited labor and, at the same time, the support bracket must provide enough stiffness to each bushing well interrupter device so as to not allow any additional stresses at the transformer bushing well than are currently present in the existing transformers.

SUMMARY

The following discussion discloses and describes a support bracket assembly for supporting a pair of bushing well interrupter devices provided within a transformer enclosure that encloses a transformer. The support bracket assembly includes a mounting bracket assembly rigidly secured to the enclosure and including a plurality of mounting bosses. The support bracket assembly further includes a first support bracket secured to one of the interrupter devices, a second support bracket secured to the other interrupter device, a third support bracket secured to the first support bracket, where the third support bracket includes a plurality of mounting bosses, and a fourth support bracket secured to the second support bracket, where the fourth support bracket includes a plurality of mounting bosses. The support bracket assembly also includes a first adjustable link secured to one of the mounting bosses on the mounting assembly and one of the mounting bosses on the third support bracket, a second adjustable link secured to another one of the mounting bosses on the mounting assembly and one of the mounting bosses on the fourth support bracket, and a third adjustable link secured to another one of the mounting bosses on the third support bracket and another one of the mounting bosses on the fourth support bracket, where the first, second and third adjustable links form a triangular configuration.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a support bracket assembly for supporting a pair of bushing well interrupter devices provided within a transformer enclosure is merely exemplary in nature, and is in no way intended to limit the invention or its applications or uses. For example, the support bracket assembly discussed herein has particular application for use with transformers employed in underground residential loop circuits. However, the support bracket assembly may have other applications.

Figure 1:
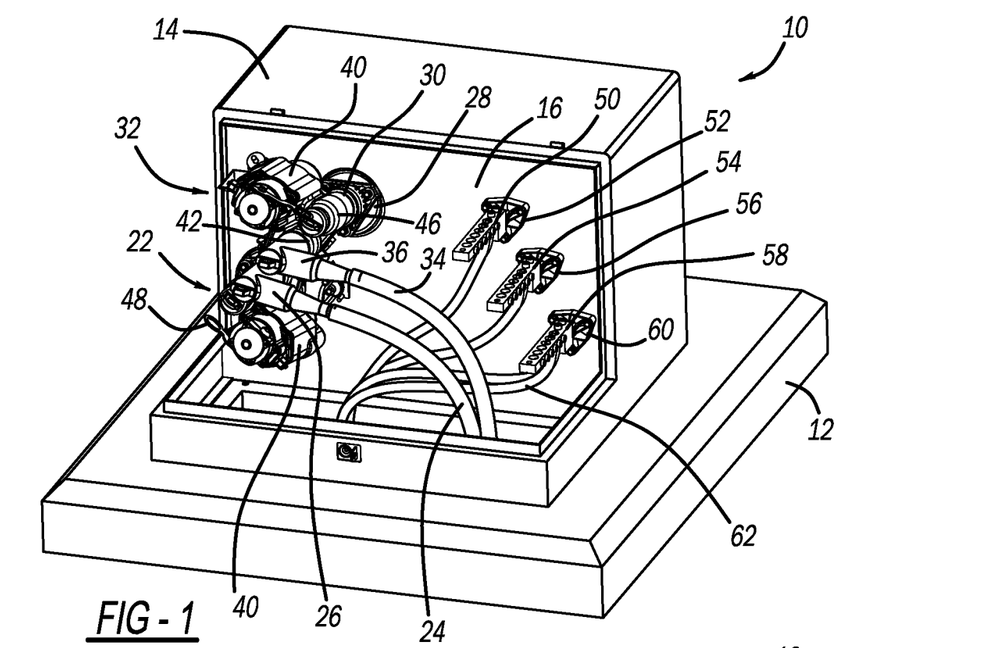
FIG. 1 is an isometric view of a pad mounted transformer employed in an underground residential loop circuit and including a pair of bushing well interrupter devices.
Figure 2:
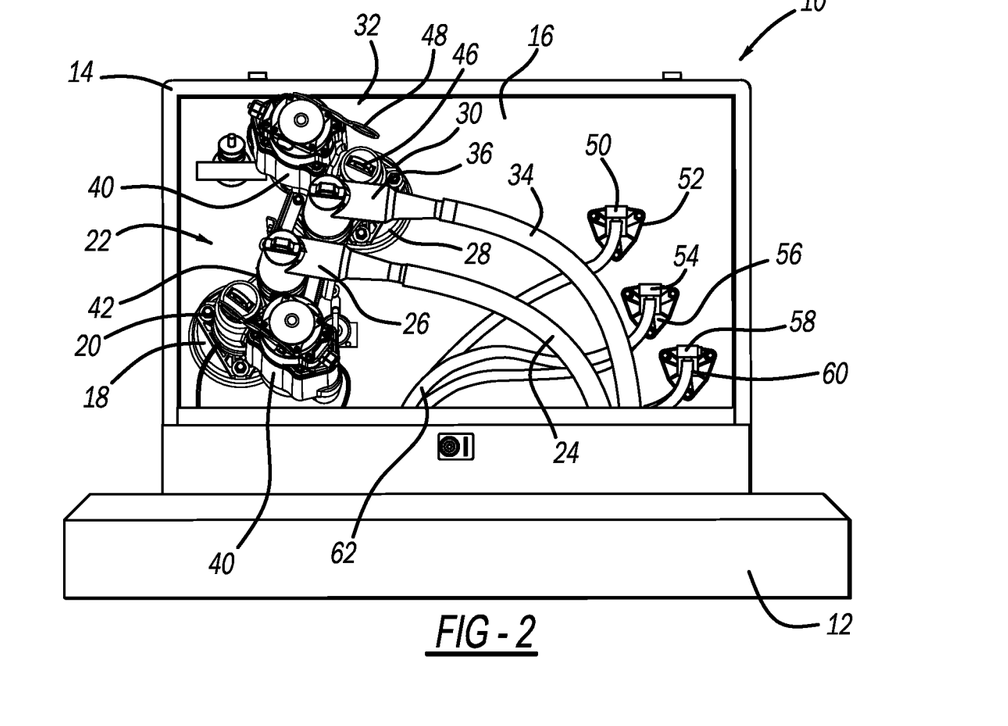
FIG. 2 is a front view of the transformer shown in FIG. 1.

FIG. 1 is an isometric view and FIG. 2 is a front view of a transformer 10 of the type that is mounted on a pad 12 that may be employed in an underground single-phase lateral loop circuit that feeds residential and commercial customers. The transformer 10 includes an enclosure 14 that houses the transformer primary and secondary coils (not shown) and other electrical components (not shown) of the transformer 10. A cover of the enclosure 14 has been removed to expose a panel 16 in the enclosure 14. A connector bushing 20 positioned within and coupled to a bushing well 18 extends through the panel 16 that accepts a bushing well interrupter device 22 that connects a power line 24 having an elbow connector 26 to one side of the primary coil and a connector bushing 30 positioned within and coupled to a bushing well 28 extends through the panel 16 that accepts a bushing well interrupter device 32 that connects a power line 34 having an elbow connector 36 to the other side of the primary coil, where the bushing well interrupter devices 22 and 32 are configured to provide automatic protection, isolation and power restoration of a lateral loop circuit without handling cable elbows. It is noted that the devices 22 and 32 are mirror images of each other to accommodate spacing for the existing features on the transformer 10. The devices 22 and 32 each include an outer enclosure 40, a load-break interface 42, a transformer interface 46 and a manual handle 48. A 120 V positive connector 50 is coupled to the secondary coil through a connector bushing 52 in the panel 16, a 120 V negative connector 54 is coupled to the secondary coil through a connector bushing 56 in the panel 16, and a neutral connector 58 is coupled to the secondary coil through a connector bushing 60 in the panel 16. Distribution lines 62 are connected to the connectors 50, 54 and 58 to deliver low voltage power to the desired number of loads (not shown). In this example, the lines 24, 34 and 62 run underground.

Figure 3:
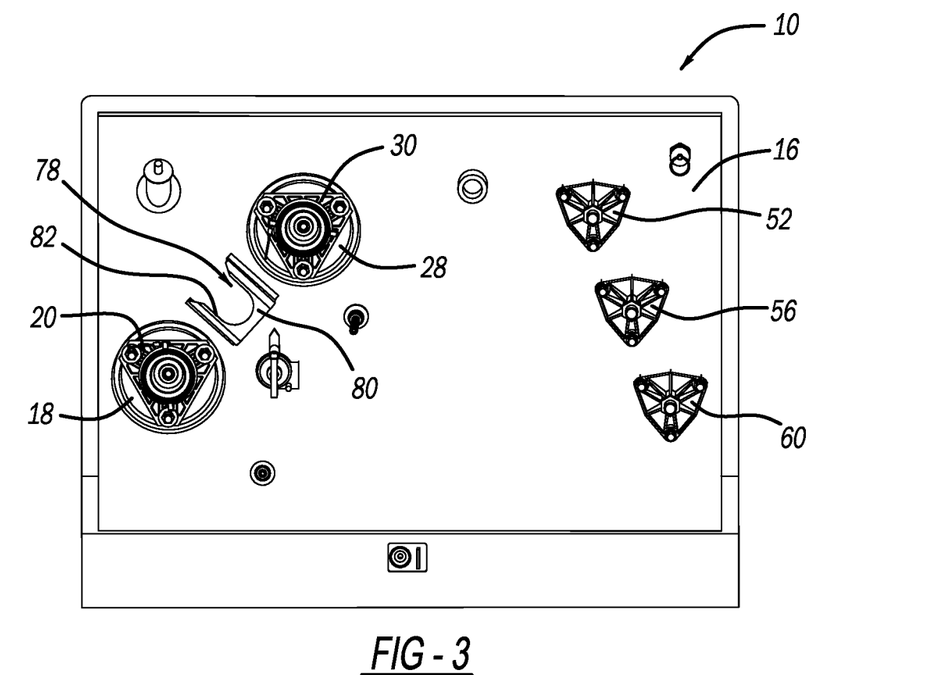
FIG. 3 is a front view of the transformer shown in FIG. 1 with the bushing well interrupter devices and other components removed.

As will be discussed in detail below, a support bracket assembly 76 (see FIGS. 4 and 5) is added to the transformer 10 to support the bushing well interrupter devices 22 and 32 on the panel 16. To begin this discussion, FIG. 3 shows the transformer 10 with the bushing well interrupter devices 22 and 32 and other components removed, which illustrates a parking stand 78 that is welded to the panel 16 between the bushing connectors 20 and 30, where the parking stand 78 includes a raised panel 80 having a cut-out section 82. The parking stand 78 is an existing fixture that allows one of the elbow connectors 26 or 36 to be supported thereto when it is disconnected from the bushing connector 20 or 30 to provide a break in the loop circuit prior to the bushing well interrupter devices 22 and 32 being employed in the transformer 10, which will be used to support the bracket assembly 76 referred to above. More particularly, when the elbow connector 26 or 36 is removed from the bushing 20 or 30, it is inserted in the cut-out section 82 so that part of it locks between the panels 16 and 80. The bushing well interrupter devices 22 and 32 are an added feature to existing transformers of the type shown and described above already operating in the field, and are configured to be usable in the space provided in the enclosure 14 including providing access to the parking stand 78.

Figure 4:
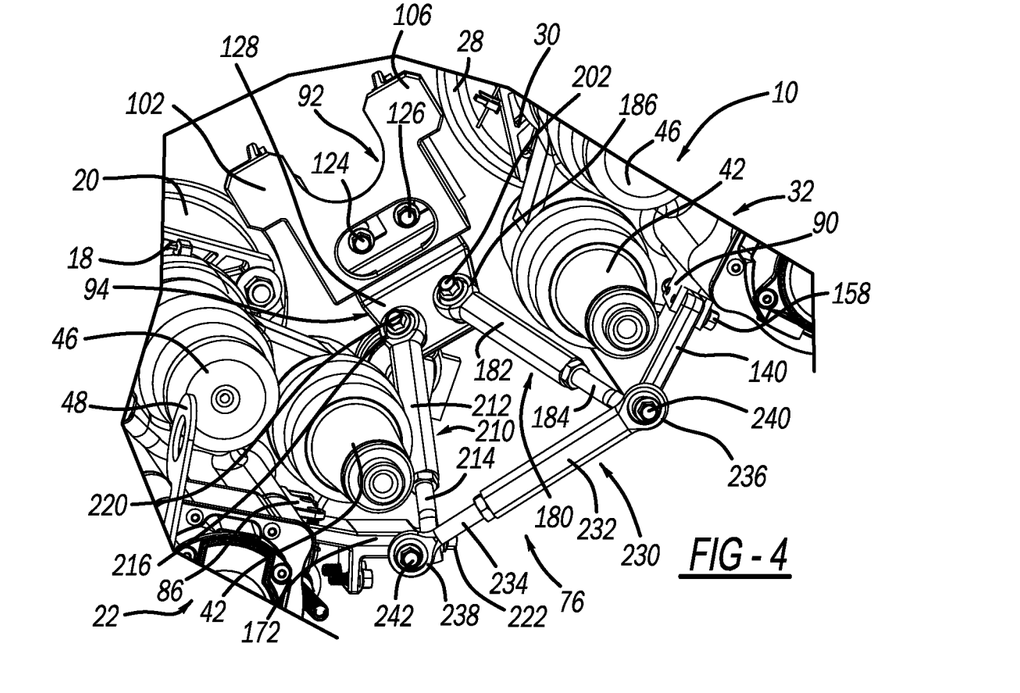
FIG. 4 is a broken-away front view of the transformer illustrating a support bracket assembly for supporting the bushing well interrupter devices to the transformer enclosure.
Figure 5:
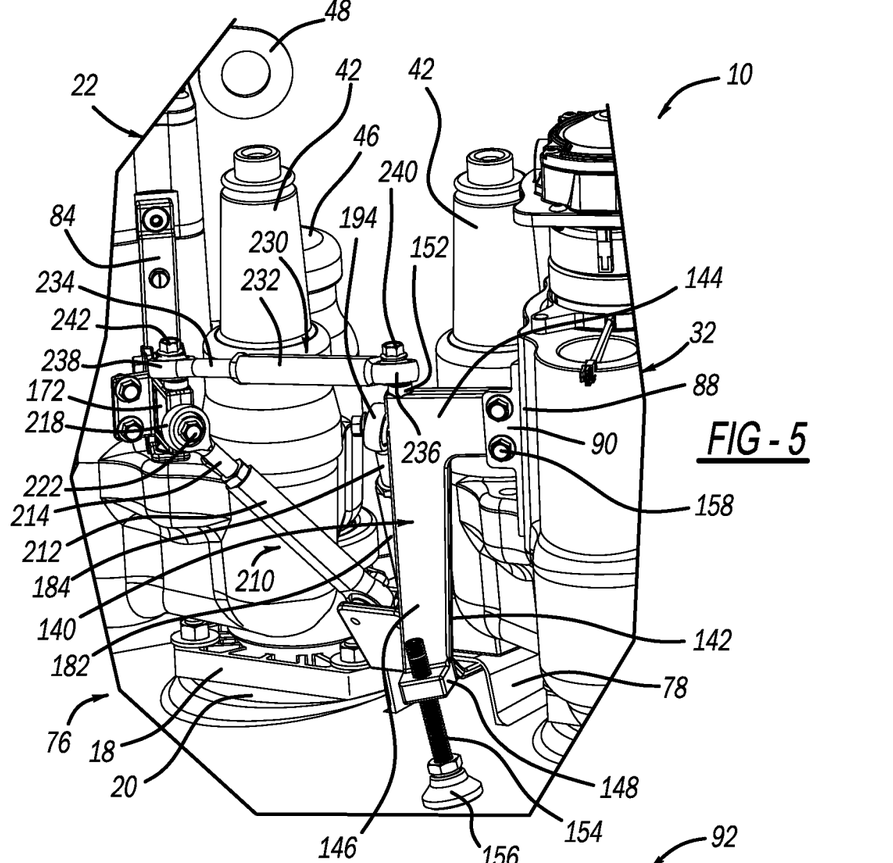
FIG. 5 is a broken-away side view of the transformer illustrating the support bracket assembly.
Figure 6:
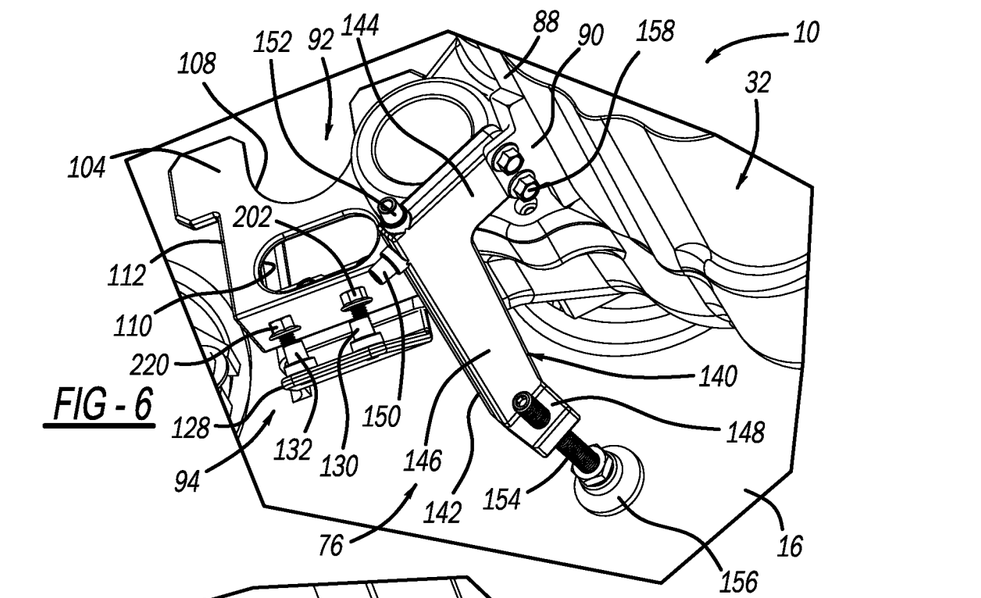
FIG. 6 is a broken-away view of the transformer illustrating the support bracket assembly in a partially assembled state.
Figure 7:
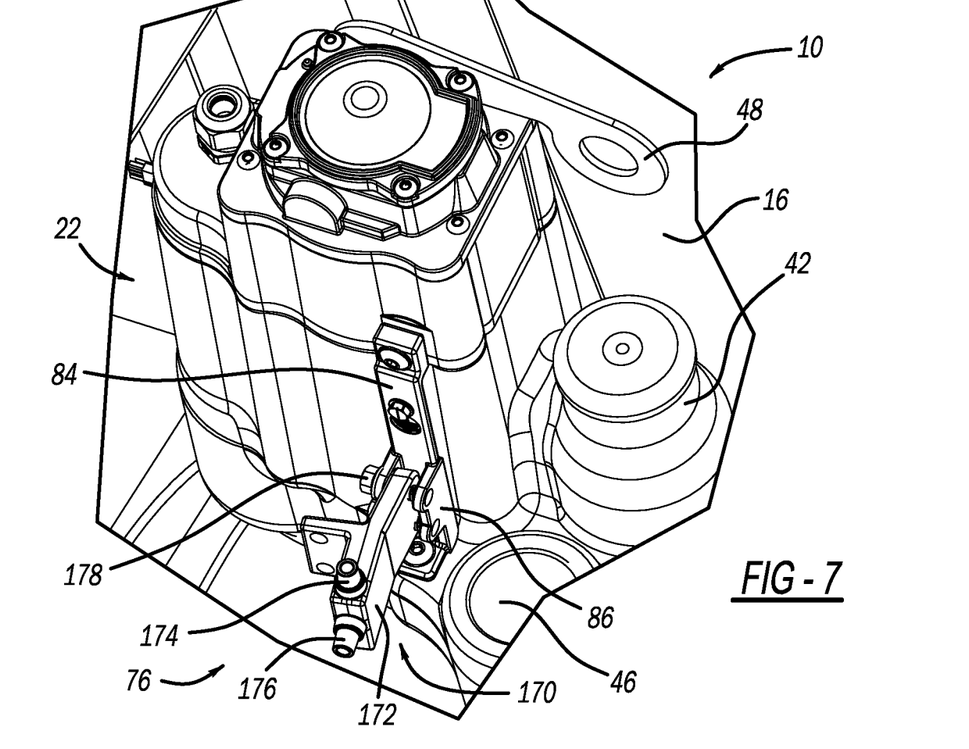
FIG. 7 is a broken-away view of the transformer illustrating the support bracket assembly in a further partially assembled state.
Figure 8:
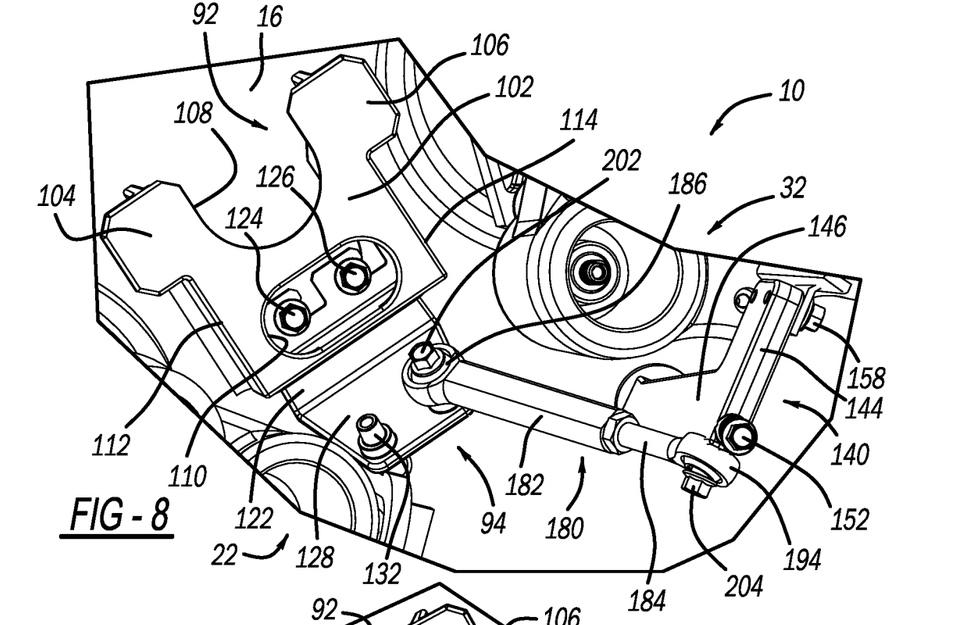
FIG. 8 is a broken-away view of the transformer illustrating the support assembly in a further partially assembled state.
Figure 9:
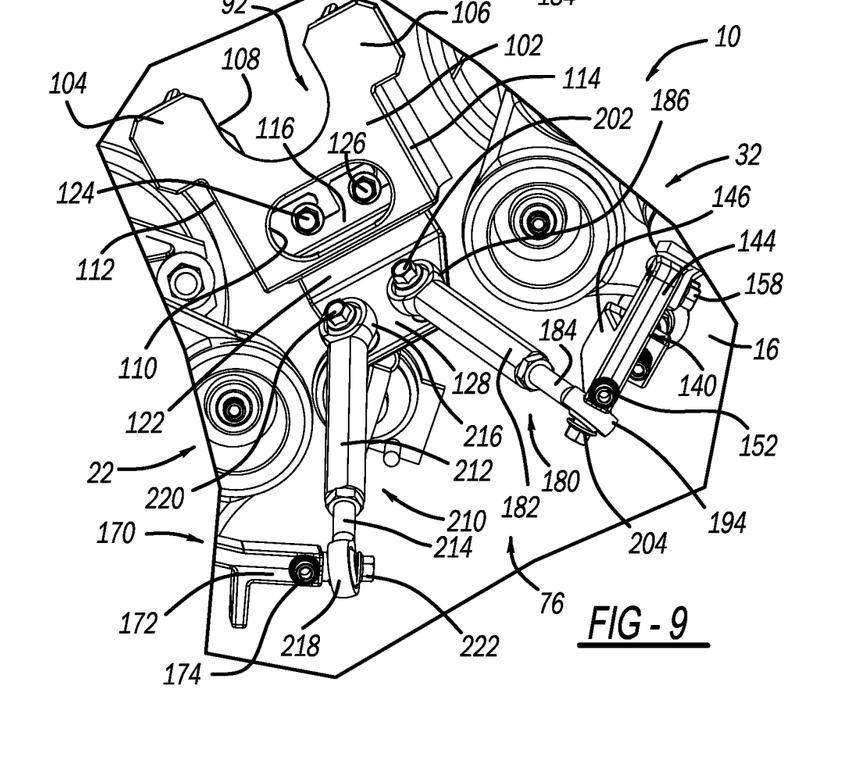
FIG. 9 is a broken-away view of the transformer illustrating the support bracket assembly in a further partially assembled state.
Figure 10:
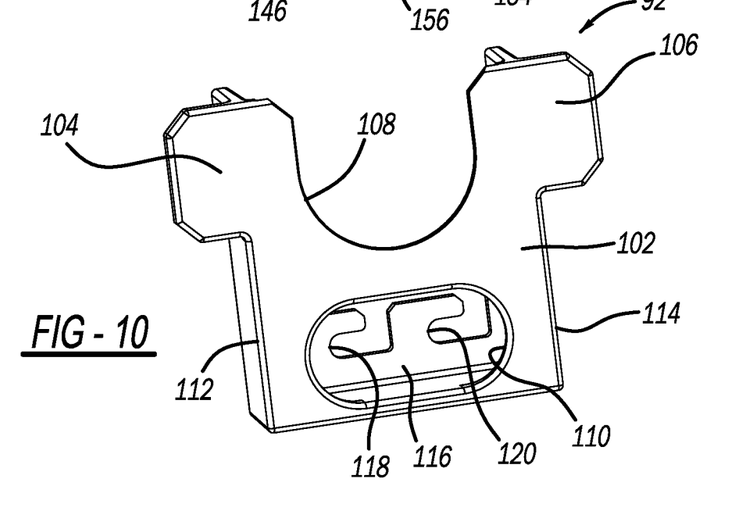
FIG. 10 is an isometric view of a parking stand support bracket that is part of the support bracket assembly.
Figure 11:
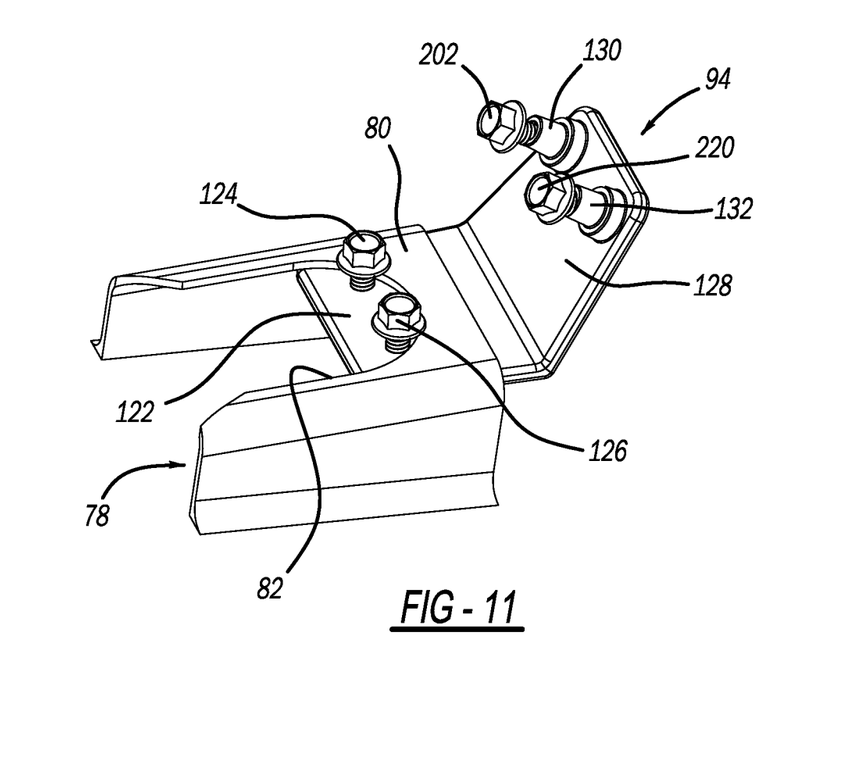
FIG. 11 is an isometric view of a parking stand anchor bracket that is part of the support bracket assembly.

FIG. 4 is a broken-away front view and FIG. 5 is a broken-away side view of the transformer 10 illustrating the support bracket assembly 76 and FIGS. 6-9 are broken-away views of the transformer 10 illustrating the support bracket assembly 76 is various stages of assembly. Before the bushing well interrupter devices 22 and 32 are secured to the connector bushings 20 and 30, respectively, a support bracket 84 having opposing flanges 86 is bolted to the interface of the device 22 and a support bracket 88 having opposing flanges 90 is bolted to the interface of the device 32. The assembly 76 is secured to the parking stand 78 using a parking stand bracket 92 and an anchor bracket 94, where FIG. 10 shows the parking stand bracket 92 separated from the assembly 76 and FIG. 11 shows the anchor bracket 94 positioned relative to the parking stand 78. The bracket 92 includes a top wall 102 having wings 104 and 106, a cut-out section 108 and an oval window 110, side walls 112 and 114 and a lower flange 116 having a pair of J-shaped slots 118 and 120 that can be seen through the window 110. The bracket 92 has the general configuration of the parking stand 78 to allow it to be used as a parking stand for the elbow connectors 26 and 36 when the parking stand 78 is being used to secure the bracket assembly 76. The anchor bracket 94 includes a base portion 122 to which are secured raised bolts 124 and 126 and an anchor portion 128 to which are secured tapered bosses 130 and 132. The anchor portion 122 is slid between the panels 16 and 80 and the bolts 124 and 126 are extended through the cut-out section 82. The bracket 92 is positioned so that the bolts 124 and 126 are inserted and locked in the J-shaped slots 118 and 120, respectively. The bolts 124 and 126 are then tightened to secure the brackets 92 and 94 to the parking stand 78.

The assembly 76 also includes a support bracket 140 having an L-shaped body 142 with a short portion 144 and a long portion 146. A tab 148 extends from the long portion 146, a tapered boss 150 including a threaded opening extends from the side of the long portion 146 and a tapered boss 152 including a threaded opening extends from the short portion 144. A threaded rod 154 is threaded into the tab 148, where the rod 154 includes a support 156 mounted thereto opposite to the tab 148. The short portion 144 is bolted to the flanges 90 by bolts 158 and the threaded rod 154 is adjusted by threading through the tab 148 so that the support 156 pushes against the panel 16 with the desired force to prevent downward sagging of the device 32. The assembly 76 also includes a support bracket 170 having a T-shaped body 172. One end of the body 172 includes tapered bosses 174 and 176 having threaded openings extending therefrom and an opposite end of the body portion 172 is bolted to the flanges 86 by bolts 178.

Figure 12:
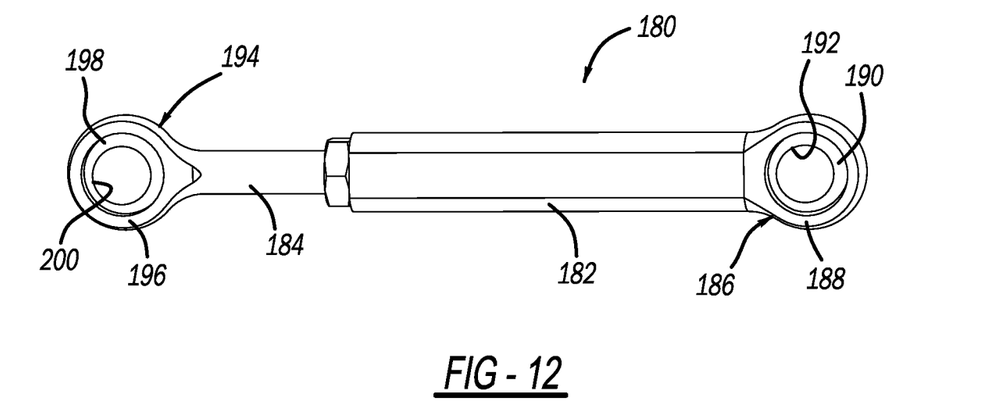
FIG. 12 is a front view of an adjustable link that is part of the support bracket assembly.

The assembly 76 also includes an adjustable link 180 having a cylindrical portion 182 and a threaded portion 184 threaded into the cylindrical portion 182. FIG. 12 is a front view of the link 180 separated from the bracket assembly 76. The cylindrical portion 182 includes a ball joint 186 at an end opposite to the threaded portion 184, where the ball joint 186 includes a ring 188 and a ball 190 having an opening 192 rotatably mounted within the ring 188. The threaded portion 184 includes a ball joint 194 at an end opposite to the cylindrical portion 182, where the ball joint 194 includes a ring 196 and a ball 198 having an opening 200 rotatably mounted within the ring 196. The ball 190 is slid onto the boss 130 and secured thereto by a bolt 202 threaded into the opening 192. The threaded portion 184 is threaded so that the ball joint 194 aligns with the boss 150. The ball 198 is slid onto the boss 150 and secured thereto by a bolt 204 threaded into the opening 200.

The assembly 76 also includes an adjustable link 210 having a cylindrical portion 212 and a threaded portion 214 threaded into the cylindrical portion 212, where the link 210 is identical to the link 180. The cylindrical portion 212 includes a ball joint 216 at an end opposite to the threaded portion 214 and the threaded portion 214 includes a ball joint 218 opposite to the cylindrical portion 212. The ball joint 216 is mounted to the boss 132 and secured thereto by a bolt 220 threaded into the opening of the boss 132. The threaded portion 214 is threaded so that the ball joint 218 aligns with the boss 176. The threaded portion is then retracted a predetermined amount and the device 22 is lifted against sagging so that the ball joint 218 again aligns with the boss 176. The ball joint 218 is then mounted to the boss 176 and secured thereto by a bolt 222 threaded into the opening of the boss 176.

The assembly 76 also includes an adjustable link 230 having a cylindrical portion 232 and a threaded portion 234 threaded into the cylindrical portion 232, where the link 230 is identical to the link 180. The cylindrical portion 232 includes a ball joint 236 at an end opposite to the threaded portion 234 and the threaded portion 234 includes a ball joint 238 opposite to the cylindrical portion 232. The ball joint 236 is mounted to the boss 152 and secured thereto by a bolt 240 threaded into the opening of the boss 152. The threaded portion 234 is threaded so that the ball joint 238 aligns with the boss 174. The ball joint 238 is then mounted to the boss 174 and secured thereto by a bolt 242 threaded into the opening of the boss 174. Thus, the combination of the adjustable links 180, 210 and 230 form a triangular configuration.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A support bracket assembly for supporting a pair of switching devices that are mounted to a transformer enclosure that encloses a transformer, the support bracket assembly comprising:
   a mounting bracket assembly rigidly secured to the transformer enclosure and including a plurality of first mounting bosses;
   a first support bracket secured to one of the switching devices;
   a second support bracket secured to another one of the switching devices;
   a third support bracket secured to the first support bracket, the third support bracket including a plurality of second mounting bosses;
   a fourth support bracket secured to the second support bracket, the fourth support bracket including a plurality of third mounting bosses;
   a first adjustable link secured to one of the first mounting bosses on the mounting bracket assembly and one of the second mounting bosses on the third support bracket;
   a second adjustable link secured to another one of the first mounting bosses on the mounting bracket assembly and one of the third mounting bosses on the fourth support bracket; and
   a third adjustable link secured to another one of the second mounting bosses on the third support bracket and another one of the third mounting bosses on the fourth support bracket.

2. The support bracket assembly according to claim 1 wherein the first, second and third adjustable links form a triangular configuration.

3. The support bracket assembly according to claim 1 wherein each of the first, second and third adjustable links includes a cylindrical portion and a threaded portion that is threaded into the cylindrical portion.

4. The support bracket assembly according to claim 3 wherein each of the first, second and third adjustable links includes a ball joint at an end of the cylindrical portion opposite to the threaded portion and a ball joint at an end of the threaded portion opposite to the cylindrical portion, wherein each ball joint is coupled to a particular one of the first, second and third mounting bosses.

5. The support bracket assembly according to claim 4 wherein each ball joint is coupled to the particular one of the first, second and third mounting bosses by a bolt threaded into an opening in the particular one of the first, second and third mounting bosses mounting boss.

6. The support bracket assembly according to claim 1 wherein the transformer enclosure includes a parking stand, the mounting bracket assembly including an anchor bracket having a pair of bolts and the first mounting bosses and a parking stand bracket including a pair of slots, and wherein the anchor bracket is positioned on one side of the parking stand and the parking stand bracket is position on another side of the parking stand, wherein the pair of bolts are secured in the pair of slots and tightened to secure the mounting bracket assembly to the parking stand.

7. The support bracket assembly according to claim 6 wherein the parking stand bracket includes a cut-out section that aligns with a cut-out section in the parking stand.

8. The support bracket assembly according to claim 1 wherein the third support bracket includes a threaded rod and a support, the support being positioned against the transformer enclosure and the threaded rod being threaded to support a weight of the another one of the switching devices.

9. The support bracket assembly according to claim 1 wherein the switching devices are bushing well interrupter devices.

10. The support bracket assembly according to claim 9 wherein the transformer is part of an underground residential loop circuit.

11. A support bracket assembly for supporting a pair of bushing well interrupter devices that are each mounted to a bushing well connector extending into a transformer enclosure that encloses a transformer, the transformer enclosure including a parking stand provided between the bushing well connectors, the support bracket assembly comprising:
 a mounting bracket assembly rigidly secure to the parking stand and including a plurality of brackets and a plurality of first mounting bosses on one of the brackets;
 a first support bracket secured to one of the bushing well interrupter devices;
 a second support bracket secured to another one of the bushing well interrupter devices;
 a third support bracket secured to the first support bracket, the third support bracket including a plurality of second mounting bosses;
 a fourth support bracket secured to the second support bracket, the fourth support bracket including a plurality of third mounting bosses;
 a first adjustable link including a cylindrical portion and a threaded portion that is threaded into the cylindrical portion, the first adjustable link being secured to one of the first mounting bosses on the mounting bracket assembly and one of the second mounting bosses on the third support bracket;
 a second adjustable link including a cylindrical portion and a threaded portion that is threaded into the cylindrical portion, the second adjustable link being secured to another one of the first mounting bosses on the mounting bracket assembly and one of the third mounting bosses on the fourth support bracket; and
 a third adjustable link including a cylindrical portion and a threaded portion that is threaded into the cylindrical portion, the third adjustable link being secured to another one of the second mounting bosses on the third support bracket and another one of the third mounting bosses on the fourth support bracket.

12. The support bracket assembly according to claim 11 wherein the first, second and third adjustable links form a triangular configuration.

13. The support bracket assembly according to claim 11 wherein each of the first, second and third adjustable links includes a ball joint at an end of the cylindrical portion opposite to the threaded portion and a ball joint at an end of the threaded portion opposite to the cylindrical portion, wherein each ball joint is coupled to a particular one of the first, second and third mounting bosses.

14. The support bracket assembly according to claim 13 wherein each ball joint is coupled to the particular one of the first, second and third mounting bosses by a bolt threaded into an opening in the particular one of the first, second and third mounting bosses.

15. The support bracket assembly according to claim 11 wherein the mounting bracket assembly includes an anchor bracket having a pair of bolts and the first mounting bosses and a parking stand bracket including a pair of slots, and wherein the anchor bracket is positioned on one side of the parking stand and the parking stand bracket is position on another side of the parking stand, wherein the pair of bolts are secured in the pair of slots and tightened to secure the mounting bracket assembly to the parking stand.

16. The support bracket assembly according to claim 15 wherein the parking stand bracket includes a cut-out section that aligns with a cut-out section in the parking stand.

17. The support bracket assembly according to claim 11 wherein the third support bracket includes a threaded rod and a support, the support being positioned against the transformer enclosure and the threaded rod being threaded to support a weight of the another one of the bushing well interrupter devices.

18. A support bracket assembly for supporting a pair of switching devices that are mounted to a transformer enclosure that encloses a transformer, the support bracket assembly comprising:
 a mounting bracket assembly rigidly secured to the transformer enclosure; and
 three adjustable links interconnected and coupled among and between the mounting bracket assembly and the switching devices so that the three adjustable links form a triangular configuration.

19. The support bracket assembly according to claim 18 wherein each of the three adjustable links includes a cylindrical portion and a threaded portion that is threaded into the cylindrical portion.

20. The support bracket assembly according to claim 19 wherein each of the three adjustable links includes a ball joint at an end of the cylindrical portion opposite to the threaded portion and a ball joint at an end of the threaded portion opposite to the cylindrical portion.

* * * * *